Jan. 29, 1924.

D. C. PRINCE

ELECTRIC SHIP PROPULSION

Original Filed Sept. 9, 1921    3 Sheets-Sheet 2

Inventor:
David C. Prince,
by *Alexander S. Lunt*
His Attorney.

Jan. 29, 1924.　　　　　　　　　　　　　　　　1,481,880
D. C. PRINCE
ELECTRIC SHIP PROPULSION
Original Filed Sept. 9, 1921　　3 Sheets-Sheet 3

Fig. 4.

Inventor:
David C. Prince,
by *his Attorney*

Patented Jan. 29, 1924.

1,481,880

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

ELECTRIC SHIP PROPULSION.

Refiled for abandoned application Serial No. 499,507, filed September 9, 1921. This application filed February 8, 1923. Serial No. 617,820.

*To all whom it may concern:*

Be it known that I, DAVID C. PRINCE, a citizen of the United States, residing at Schenectady, county of Schenectady, State of New York, have invented certain new and useful Improvements in Electric Ship Propulsion, of which the following is a specification.

This application is a continuation in part of my application, Serial No. 365,762, filed March 15, 1920, for electric ship propulsion and a substitute for my application, Serial No. 499,507, filed Sept. 9, 1921 for electric ship propulsion.

My invention relates to electric power systems and more particularly to electric ship propulsion systems wherein one or more alternating current motors are arranged to operate the propeller or propellers, although certain features of my invention are adapted to be used wherever an individual prime mover dynamo plant is arranged to supply alternating current to induction motors which are required to be operated under conditions analogous to those occurring in ship propulsion, and an object of my invention is to provide means based upon the slip of the motor for controlling the operation of the system.

A further object of my invention is to provide means for automatically performing various control operations in an electric ship propulsion system in accordance with the value of the slip of the propeller driving motors.

A further object of my invention is to provide automatically operating control means for an electric ship propulsion system, whereby the stability of operation may be increased and the efficiency of the system maintained at a high value.

It has been found that practically all of the phenomena observed in connection with the operation of electrically driven ships can be referred to the slip of the propeller driving motor notwithstanding the fact that the primary frequency is varied between wide limits and the primary voltage varied over a considerable range. The maximum torque of the induction motor for given action takes place at a constant number of cycles per second slip; furthermore, any percentage of the maximum torque corresponds to a perfectly definite and constant number of cycles slip. I have, therefore, conceived the idea of basing the control of various operations upon the slip measured in cycles.

It has been found that when starting and reversing the ship, it is desirable to increase the alternator excitation. Under these circumstances, the slip is high and the device operating on slip will, therefore, be made to increase the excitation. If the vessel runs into headwinds or other storm conditions, it may be necessary to increase the alternator excitation. The necessity for this increase is accompanied by an increase in the number of cycles slip above normal. The highest efficiency of operation is obtained when the minimum amount of excitation consistent with sufficient torque in the motor, is supplied to the alternator. As long as the slip does not exceed a known constant value in cycles per second the excitation may be reduced. The limit of such a reduction is at once indicated by an increase in the number of cycles slip above the predetermined value. If, for example, the ship's rudder is suddenly thrown to one side, an increased load is placed upon the motor and the resulting increase in slip indicates that the excitation should be increased on the generator. Besides an increase in the generator excitation, the motor torque, with relation to the propeller torque, may be increased by a decrease in the speed of the driving means for the generator. This decrease, will when stability has been reached, cause the slip to fall below the predetermined amount. All of the adjustments mentioned may, therefore, be taken care of by a device arranged to operate on a basis of actual number of cycles slip of the motor. It is sometimes desirable, moreover, under certain conditions to change the induction motor characteristics by controlling the amount of resistance in the secondary or by operating contactors which control low resistance windings thus varying the equivalent resistance of the secondary. The time for such changes is very accurately determined by the cycles slip of the motor.

According to my invention differential controlling mechanism is arranged to respond to departure from a predetermined number of cycles slip, as distinguished from variations in the per cent of slip, for the reason that in a ship propulsion system the frequency varies over such a wide range as to render any device operating in response to changes in the per cent of slip useless for the purpose described.

My invention will be better understood from the following description taken in connection with the accompanying drawings and its scope will be pointed out in the appended claims.

Referring to the the accompanying drawings.

Figures 1, 1A:
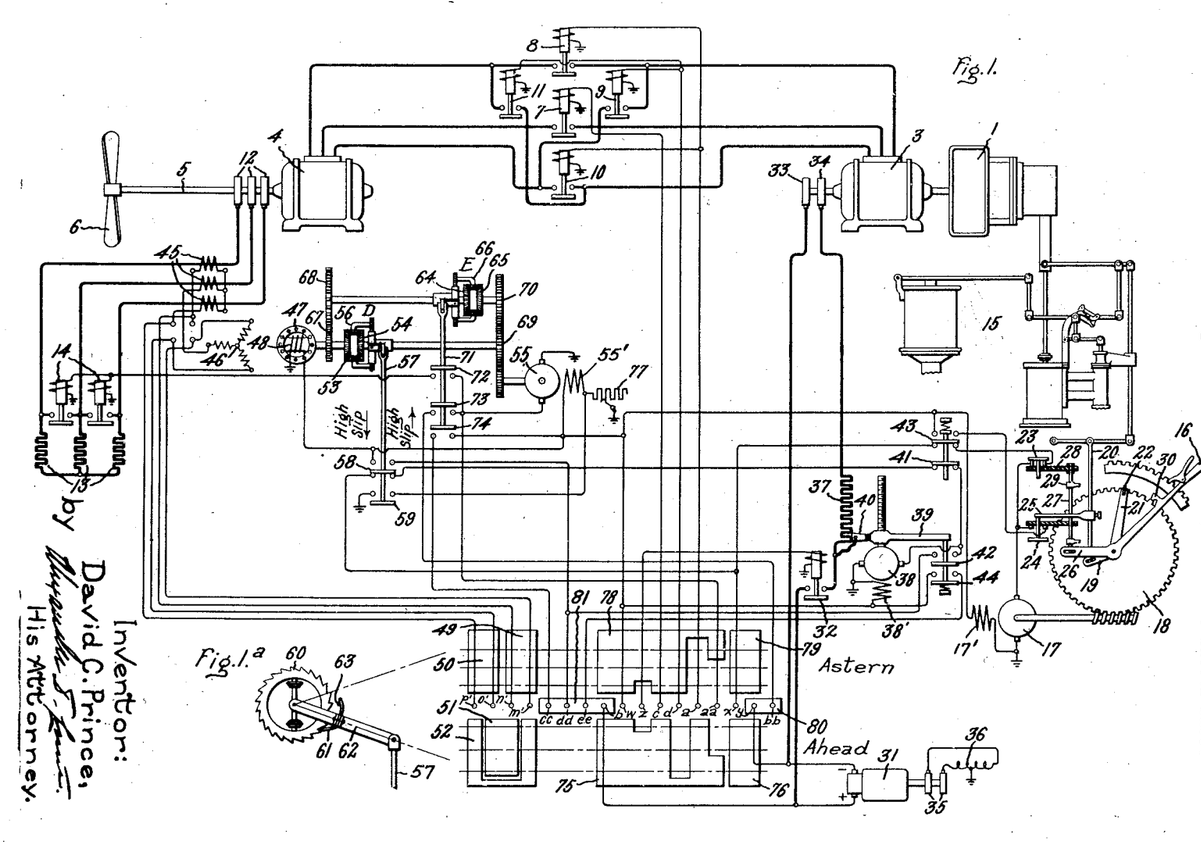
Fig. 1 is a diagrammatic representation of an induction motor ship propulsion system provided with means for controlling the operation of the system both during maneuvering and during normal operation in accordance with the slip of the propeller driving motor.
Fig. 1a shows a detail of the differential switch operating mechanism of Fig. 1.

Referring to Fig. 1, an elastic fluid turbine 1 is arranged to drive directly the revolving field member of a synchronous generator 3 connected to the propeller driving induction motor 4 whose rotor shaft 5 is directly connected to the propeller 6. Circuit controlling and reversing contactors 7, 8, 9, 10 and 11 are provided in the connections between the generator 3 and motor 4. With contactors 7, 8 and 10 closed, the phase rotation is such that the propeller is driven in one direction, and with contactors 7, 9 and 11 closed, the phase rotation is reversed to reverse the direction of propeller rotation. Slip rings 12 permit of connecting resistors 13 in the secondary circuit of the motor for starting and reversing and contactors 14 are arranged to short circuit resistors 13 as hereinafter described. The turbine 1 is provided with any suitable form of adjustable speed governor 15, the mechanism illustrated being that of the U. S. patent to Emmet, No. 1,137,308, April 27, 1915. The governor setting is arranged to be controlled either manually by speed lever 16 or automatically by pilot motor 17 having a field winding 17'. The pilot motor is arranged to drive gear 18 which is normally arranged to move a bell-crank lever, one arm 19 of which is connected to the rod 20 which controls the governor setting. The other arm 21 of this bell-crank lever is provided with a pivoted member 22 which connects the gear 18 to the bell-crank lever. Limit switches 23 and 24 are provided in the circuit of motor 17 and these limit switches are arranged to be controlled by a member 25 adjustably secured to the rod 20. Limit switch 24 is arranged to be operated when the pilot motor has moved the governor to its minimum speed setting. Limit switch 23 is arranged to be opened whenever the pilot motor has set the governor for any predetermined speed limit, and I have arranged the lever 16 to permit of adjusting this limit. To accomplish this result, I have arranged the lever 16 as a bell-crank, the arm 26 of which is arranged to operate the rod 27 which carries the member 28, upon which the limit switch 23 is mounted. The rod 27 is represented as moving through guiding members 29. Lever 16 is provided with a notched projection 30 which is adapted to depress and engage one end of the pivoted member 22 to release the bell-crank lever 19, 21 from the gear 18 and connect it to the arm 16. This arrangement makes it possible to disconnect the pilot motor control at any time manual operation by lever 16 is desired. Whenever it is desired to restore pilot motor operation, it is merely necessary to disengage member 22 from the notch in member 30 and move lever 16 to any desired speed limiting position. An exciter 31 is adapted to be connected by contactor 32 to supply excitation current to the slip rings 33 and 34 connected to the generator field winding. The exciter 31 is provided with slip rings 35 connected to a reactance 36, the midpoint of which is grounded to provide a three-wire system for the control circuits of the system. A resistance 37 is provided in the generator field circuit and the amount of this resistance is arranged to be adjusted by a pilot motor 38 having a field winding 38'. An arm 39 moving with sliding contact 40 operates limit switches 41 and 42 to interrupt the circuit of pilot motor 38 when the limit of its travel in either direction is reached. At the end of its travel corresponding to minimum resistance and, therefore, maximum field strength, arm 39 is arranged to operate a contact 43 which controls the circuit of governor pilot motor 17 as hereinafter set forth. A contact 44 is interlocked with contact 42 and arranged to control the circuit of field winding 38' for a purpose hereinafter set forth. Current transformers 45 are provided in the secondary circuit of motor 4 and these transformers are connected to the stator winding 46 of a small synchronous motor 47, the rotating field member of which is shown at 48. The electric controller is provided with segments 49, 50, 51 and 52 cooperating with controller fingers $m'$, $n'$, $o'$, $p'$ to control the direction of phase rotation between transformers 45 and stator winding 46. Motor 47 is arranged to drive one gear 53 of the differential mechanism D. The gear 54 of differential D is arranged to be driven at substantially constant speed by pilot motor 55 having a field winding 55′. The planet carrier 56 of differenetial D is arranged to operate a rod 57 carrying contacts 58 and 59. Contact 58 is arranged to control the circuit of pilot motor 38 as hereinafter described. The construction of differential D is more clearly shown in Fig. 1ª from which it may be seen that the planet carrier is connected to a toothed ring 60 which cooperates with a spring member 61 mounted on arm 62 which moves rod 57. A stationary pin 63 is arranged to cooperate with the spring member 61 to disengage said spring member from toothed ring 60 upon a predetermined movement of rod 57 in either direction. It is apparent from this construction that the rod 57 will be moved in one direction or the other in accordance with the direction of motion of the planet carrier, and that, while the motion given to the rod 57 is limited, the planet carrier is free to revolve continuously in either direction. It is obvious, however, that my invention is not limited to any particular construction for enabling the differential D to operate the contacts 58 and 59. Motor 47 is also arranged to drive one gear 64 of a second differential E, the other gear 65 of which is also driven by pilot motor 55. The second differential E is, however, geared to motors 47 and 55 so that the planet carrier 66 will be stationary for a different ratio of speeds than that which renders the planet carrier 56 of differential D stationary. In the arrangement illustrated differential E is stationary for a higher ratio of speeds than differential D, speed reducing gears 67 and 68 being connected between gears 53 and gear 64, while gears 69 and 70 are arranged so that gears 54 and 65 operate at the same speed. Differential E is arranged to operate a rod 71 carrying contacts 72, 73 and 74 for purposes hereinafter set forth. It is apparent that the speed of rotation of motor 47 is a measure of the slip of motor 4 and it is, therefore, clear that the differential mechanisms D and E operate their contacts at certain predetermined values of slip in cycles per second. The speed of motor 55 determines the values of slip at which differentials D and E operate.

Assuming that the turbine has been set into operation, the operation of the arrangement shown in Fig. 1 in starting ahead from rest is as follows: In its first position, the controller segments 51 and 52 engage fingers $m'$, $n'$, $o'$, $p'$ to connect winding 46 of motor 47 for a certain direction of rotation. Controller segment 75 simultaneously energizes fingers $a$ and $c$ to close line contactors 7, 8 and 10 for ahead operation. Controller segment 75 also energizes controller finger $w$ positively to excite field winding 17′, 38′ and 55′ of the three pilot motors and to excite the field winding 48 of motor 47. Controller segment 76 also bridges fingers $x$ and $y$ to energize $x$ negatively. The next step of the controller energizes fingers $z$ to close contactor 32 to connect the generator field winding to the exciter 31. Generator 3 now supplies current to operate the propeller driving motor 4 in the ahead direction, and resistors 13 being in circuit, a strong starting torque is developed as is well-known in the art. The slip being high, motor 47 operates at a high rate of speed and maintains differentials D and E in the position corresponding to high slip. In the final positions of the controller, finger $aa$ is energized positively to operate the motor 55 clockwise. Contact 58 of differential D being closed, in its lower position, a circuit is completed from negative controller finger $x$ through contact 58 and limit switch 41 to operate the pilot motor 38 in a direction to cut out resistance 37 and increase the strength of the generator field winding. As soon as maximum field has been put upon the generator, member 39 opens contact 41 to stop the pilot motor 38 and moves contact 43 to its upper position to complete a circuit from positive controller finger $w$ through limit switch 24 to pilot motor 17, to operate said pilot motor in a direction to reduce the turbine speed to a minimum. When minimum speed has been reached limit switch 24 will be opened by member 25 and pilot motor 17 will be stopped. When motor 4 has accelerated to a point where the slip is such that the motor torque with the resistors in circuit is the same as the torque with these resistors eliminated, differential E closes contact 72 to complete a circuit from controller finger $aa$ through contact 72 to close contactors 14 and short-circuit resistors 13. Simultaneously, with the closing of contact 72 contacts 73 and 74 are closed, but the closing of the latter contacts has no effect for the reason that controller fingers $bb$ and $cc$ are at this time unenergized. A further increase in speed carries motor 4 over its point of maximum torque to the zone of stable operation. At this point differential D is arranged to reverse and move contact 58 to its upper position completing a circuit from positive controller finger $w$ through limit switch 42 to operate pilot motor 38 in a direction to insert resistance in the field circuit of the generator and thus reduce the generator field strength. However, the first motion in this direction permits contact 43 to move to its lower position to close a circuit from negative controller finger $x$ through contact 43 and limit switch 23 to operate pilot motor 17 in a direction to increase the turbine speed. The increase in turbine speed causes an increase in slip which returns differential D to the neutral position, thus preventing further motion of pilot motor 38. Pilot motor 17, however, continues to operate until the turbine has come up to the speed determined by the position of the lever 16, at which time limit switch 23 is opened and pilot motor 17 stopped. The acceleration of the turbine having ceased, the slip again falls below the predetermined value and differential D again moves contact 58 to its upper position to recomplete the positive circuit through limit switch 42 to operate pilot motor 38 to further reduce the generator field excitation, and this reduction in excitation is carried to the point where equilibrium is reached with just the safe margin of torque on the main driving motor. In order to maintain this excitation without unnecessary hunting of pilot motor 38, contact 59 is provided. This contact is arranged to short-circuit a small resistance 77 in series with the field winding 55' of pilot motor 55 when contact 58 is in its mid position. The short circuiting of this resistance slightly changes the speed of pilot motor 55 so that when the state of equilibrium is reached, it is necessary to vary the slip of the main motor 4 more than the speed change produced by resistance 77 before contact 58 can close in either its upper or lower position. Resistance 77 will be so adjusted as to permit a reasonable variation in the slip without a change in excitation. As thus arranged, motor 55 will hunt or vary in speed slightly due to the opening and closing of contact 59, but hunting of motor 38 will be prevented. Any variations in the navigating conditions of the ship, whether due to wind, wave, motions of the rudder or other causes, which tend to produce a variation in the slip of the propeller driving motor will at once cause differential D to operate to vary the excitation to that value necessary for efficient and stable operation. If, for example, storm conditions are encountered, which require greater motor torque, pilot motor 38 will operate to cut out resistance 37 until, if necessary, the generator field excitation has reached its maximum value. If the slip is still greater than the predetermined number of cycles per second, arm 39 of pilot motor 38 will move contact 43 to its upper position, thus setting pilot motor 17 into operation to lower the speed of the turbine to prevent motor 4 from falling out of step. To start the ship from standstill, it is therefore merely necessary to throw the controller into the full-ahead position, whereupon the differential mechanism will control the motor secondary circuit, the generator field circuit and the turbine speed to insure the proper acceleration of the motor, and also the proper normal operation of the ship after it has been brought up to any desired speed as determined by the setting of the speed lever 16.

With any given speed setting of lever 16, the apparatus will maintain the excitation at the lowest permissible value for stable operation at that speed.

To change from full speed ahead to full speed astern with the arrangement shown in Fig. 1, it is merely necessary to throw the controller from the ahead position to the astern position. It will be observed that contact finger $z$ is arranged to open contactor 32 to deenergize the generator field winding before the line contactors 7 to 11 are manipulated. The first step of the controller in the astern position causes segments 49 and 50 to reverse the connections for motor 47. Segment 78 energizes contact fingers $c$ and $d$ to close line contactors 7, 9 and 11 for astern operation and energizes contact finger $w$ positively to excite field windings 17', 38', 55' and 48. Controller segment 79 energizes finger $x$ negatively. The next step of the controller closes contactor 32 to excite the generator so that current is supplied to the propeller driving motor 4 for astern operation. Inasmuch as the slip is high, motor 47 sets differentials D and E to their high slip positions. Contact finger $aa$ is energized in the final position of the controller and the remaining operations take place exactly as in starting from rest, that is, resistors 13 are in circuit, resistance 37 is cut out and the turbine speed is reduced to a minimum. Resistors 13 are then short circuited, the turbine speed increased and the alternator excitation decreased to the proper value for efficient and stable operation in the astern direction.

When the controller is thrown to the off position from either direction of operation, segment 80 energizes controller finger $bb$ negatively and segment 81 energizes controller fingers $cc$, $dd$ and $ee$ positively. Finger $ee$ supplies current through contact 44 to pilot motor field winding 38'. Finger $dd$ completes a positive circuit through limit switch 42 to operate motor 38 in a direction to insert resistance 37 into the generator field circuit. When the resistance has been increased to its maximum value, member 39 opens contacts 42 and 44 to deenergize the armature and field circuits of the pilot motor 38. The circuit of field winding 55' of motor 55 is completed at this time from controller finger $ee$ through contact 44 and also from controller finger $cc$ through contact 74. The armature circuit of this motor 55 is completed from finger $bb$ through contact 73 to operate motor 55 to set differentials D and E in the position corresponding to high slip. It will be noted that, whereas the armature of motor 55 is ordinarily supplied from positive controller finger $aa$, it is at this time supplied from negative controller finger $bb$ which causes motor 55 to reverse to set differentials D and E in their high slip positions. It will be noted that contact 74 connected to contact finger cc at this time parallels contact 44. If this contact 74 were not provided and the system had been running with member 39 near the limit of its travel, contact 44 might be interrupted, to open the circuit of field winding 55', before motor 55 had had time to restore differentials D and E to their high slip positions. Differential D will, of course, reach its high slip position before differential E. When differential E reaches its high slip position, contacts 73 and 74 open to deenergize the armature and field circuits of motor 55, and contact 71 opens to cause contactors 14 to reinsert resistors 13. The turbine is permitted to continue at its last speed. It may, however, be reduced to the maneuvering speed by lever 16 if desired. The apparatus is, therefore, set in the proper condition for movement of the controller to operate either ahead or astern.

It will be apparent that my invention is not, in its broad aspects, limited to any particular means for increasing the motor torque with respect to the propeller torque when the slip varies from the predetermined value. It is obvious, for example, that the mechanism may be arranged to control the torque of an induction motor by varying the resistance in the secondary circuit step by step or gradually throughout a considerable range. It is further apparent that my invention is not limited to ship propulsion, but, on the contrary, is capable of a more general application.

The arrangement of Fig. 1 which has just been described, indicates one method of substituting an electrical equivalent for a differential mechanism combining generator speed and motor speed. It is apparent that motor 47 revolves at a speed corresponding to the frequency of slip and that the resultant effect produced by the combination of speeds of motors 47 and 55 is independent of variations in generator frequency.

Figure 2:
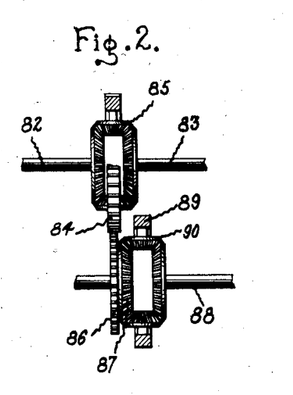
Figs. 2 and 3 represent modified forms of differential mechanism that may be used.

Fig. 2 shows a different arrangement of differential apparatus which might be used in the system shown in Fig. 1. In Fig. 2, shaft 82 is adapted to be driven in one direction by the main driving motor, while shaft 83 is adapted to be driven in the opposite direction by a small synchronous motor. Slip speed is transmitted by ring gear 84, on which the floating pinions 85 are mounted, to the gear 86 to which bevel-gear 87 of a second differential is attached. Shaft 88 is adapted to be driven at the desired constant speed so that the ring 89, which carries the floating pinions 90, will reverse when the driving motor passes above or below the critical established slip speed.

Figure 3:
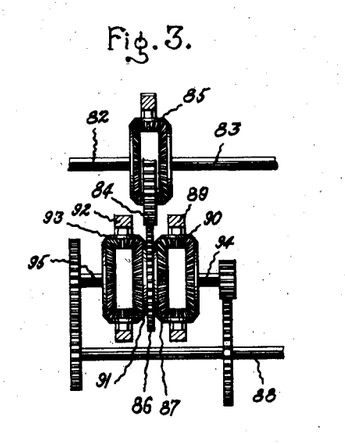

Fig. 3 is a modification of the apparatus shown in Fig. 2 adapted to perform one set of functions at one value of slip and another set of functions at another value of slip, as in the system shown in Fig. 1. In Fig. 3, gear 86, carrying gear 87, carries a second gear 91 of a third differential, the ring 92 of which carries floating pinions 93. Constant speed shaft 88 is arranged to drive shaft 94 at a higher speed than it drives shaft 95. As thus arranged, it is apparent that ring 89 will be stationary at a higher value of slip than that for which ring 92 is stationary.

The arrangement shown in Fig. 1 comprises a single turbo-alternator connected to operate a single propeller driving motor, but I have developed a similar system for battle cruiser propulsion in which there are four turbo-alternators and four propellers, each propeller arranged to be driven by two motors mounted on the same shaft, and each of the motors arranged to be operated at two speeds, the change in speed being accomplished by pole changing switches. The system also includes means for changing the internal connections of the motors, so that a high effective secondary resistance is available for starting and reversing, and a low resistance for normal operation. I have also arranged the system so that the motors may be operated collectively from any one of the alternators, and so that each alternator may be connected to operate an individual motor.

Figure 4:
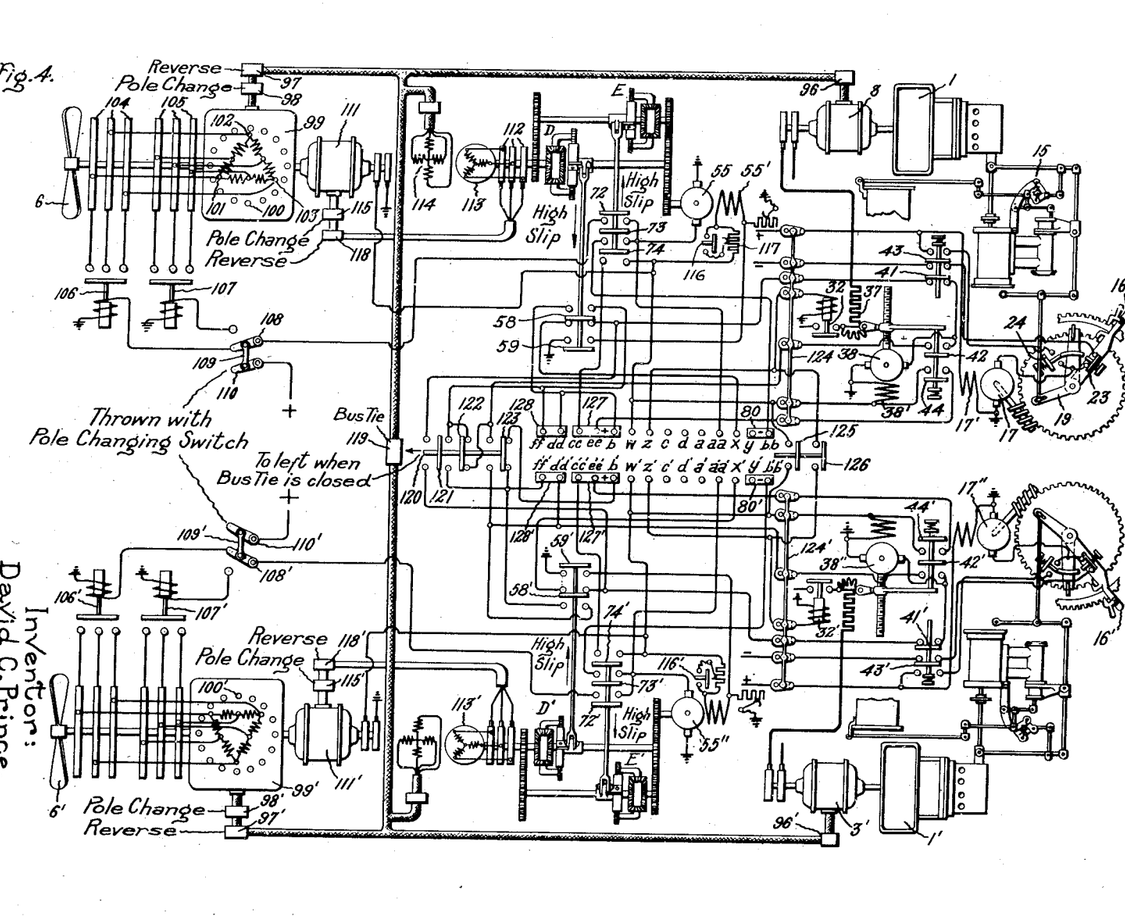
Fig 4 is a diagrammatic representation of a ship propulsion system comprising a plurality of multiple speed propeller driving motors and a plurality of generators which may be interconnected in various ways, together with means for controlling the operation of the system both during maneuvering and normal operation in accordance with the slip of the propeller driving motors.

All of the problems presented by such an installation are present in an installation wherein but two turbo-alternators and two propellers, each provided with a single driving motor, are used. Fig. 4 represents such an installation. The turbine 1 drives the alternator 3 which is connected through a disconnecting switch 96, reversing switch 97 and pole changing switch 98 to the stator of motor 99, the rotor of which is arranged to drive propeller 6. Differentials D and E are arranged to operate contacts 58, 59, 72, 73 and 74 to control the connections of pilot motors 17, 38 and motor 55 just as in the arrangement shown in Fig. 1. The controller fingers and the segments with which they make contact in the off position have been shown in Fig. 4. The segments of the controller which cooperate with these contact fingers in the operating positions have not been shown for the reason that they are the same as those shown in Fig. 1. The illustration is somewhat further simplified in Fig. 4 by showing the circuits of the motors 17 and 17″ which lead through the controlling contacts 43 and 43′ as supplied from any suitable direct current source indicated by plus and minus signs. Turbine 1′ driving alternator 3′ is connected through disconnecting switch 96′, reversing switch 97′ and pole changing switch 98′ to the stator 99′, the rotor of which is arranged to drive propeller 6′. Differentials D′ and E′ are arranged to operate contacts 58′, 59′, 72′, 73′ and 74′ to control the circuits of pilot motors 17″, 38″ and motor 55″. The limit switches 23 and 24 are shown somewhat more diagrammatically in Fig. 4 than in Fig. 1, but is is apparent from the illustration that the arrangement is functionally the same in each case. The connections to the controller contact fingers are substantially the same as the connections to the contact fingers of the controller for the other generator and motor. Inasmuch as the layout for driving one propeller is almost identical with the layout for driving the other, the description of the arrangement of parts will be confined as far as possible to one side of the ship, the corresponding elements on the other side of the ship being designated by the same reference characters primed. The rotor cooperating with stator 99 is provided with a high resistance squirrel cage winding 100 and a low resistance definite winding having points 101, 102 and 103 connected to slip rings 104 and intermediate points connected to slip rings 105. A contactor 106 is arranged to short-circuit slip rings 104 and a contactor 107 is arranged to short-circuit slip rings 105. When the pole changing switch 98 is set for one primary pole number, blade 108 of switch 109 will open the circuit of contactor 107 and prepare the circuit of contactor 106 for control by contact 72 of differential E. When pole changer 98 is set for the other pole number, blade 110 of switch 109 will complete a circuit holding contactor 106 closed, while blade 108 will prepare the circuit of contractor 107 for control by contactor 72 of differential E. The low resistance rotor definite winding is thus made responsive to the respective primary pole numbers, as will be obvious to those skilled in the art. Since the propeller driving motors are not of the ordinary slip ring type, it is necessary to resort to an arrangement different from that shown in Fig. 1 for producing slip frequency to operate differentials D and E. If a machine having an induction motor primary and a wound rotor secondary mounted upon the main motor shaft were used to produce slip frequency, it would be necessary to make such an auxiliary machine quite large if the slip frequency were transmitted from the motors to the control stations, and in order to avoid transmitting slip frequency to any distance, I provide a small auxiliary synchronous machine 111 to produce a frequency proportional to motor speed and transmit this frequency to the control station where it is introduced into the slip rings 112 of a small induction motor 113, the stator 114 of which is supplied at the frequency of generator 3. The arrangement of windings shown for motor 113 indicates that auxiliary machine 111 is a three phase machine, while the generator 3 is a two phase machine, but obviously my invention is not limited in this respect. The motor 113 rotates at slip frequency due to the fact that it combines a frequency proportional to motor speed in the rotor and line frequency in the stator. It thus operates as an electrical differential. In view of the fact that the propeller driving motor is a two speed motor, it is necessary to provide a pole changing switch 115 in the circuit of generator 111, in order to make the motor 113 rotate at the frequency of slip for both pole numbers. It is also necessary simultaneously to change the speed of motor 55, and to accomplish this a switch 116 may be operated to control a shunt circuit around an adjustable resistance 117 in the field circuit of motor 55. A reversing switch 118 is arranged in the circuit of generator 111 to be operated simultaneously with reversing switch 97 for the propeller driving motor. It is apparent that the reversing switch 97 may be controlled by controller fingers $a$, $c$, $d$, as in Fig. 1 and that reversing switch 118 may be controlled by fingers corresponding to fingers $m'$, $n'$, $o'$, $p'$ of Fig 1 if desired.

A bus-tie switch 119 is arranged to tie the motors 99 and 99′ together, and this switch will preferably be interlocked with disconnecting switches 96 and 96′ so that the generators 3 and 3′ cannot be thrown in parallel as set forth in the U. S. patent to Emmet, No. 1,214,528, February 6, 1917. A switch 120 having contacts 121, 122, 123, 125 and 126 is arranged to be operated simultaneously with the bus-tie switch. Switch 120 is provided for the purpose of interconnecting differential control mechanisms D and D′ when both motors are operated from one generator, and for segregating these control mechanisms when each generator is connected to operate its own motor. It is apparent that switch 120, in the position it occupies when the bus-tie switch 119 is open, should complete such circuits as to establish the identical connections between differential mechanism D and the devices controlled thereby as are completed in Fig. 1 heretofore described in detail. When the bus-tie switch is closed, switch 120 should so interconnect the contacts of differentials D and D′ that the excitation of the alternator will be decreased only when the slip of both motors is below the predetermined value, and so that the excitation will be increased whenever the slip of either of the propeller driving motors increases above the predetermined value. The connections by which this is accomplished will be set forth hereinafter, but it may be here stated that this result is accomplished by arranging contacts 58 and 58′ to operate in series for decreasing the generator field strength and to operate in parallel for increasing the generator field strength. Switches 124 and 124' are pilot motor disconnecting switches. Contact finger $b$ is directly connected to contact finger $dd$ and to one of the upper fixed contacts cooperating with contact 58 of differential D. Contact finger $b'$ leads through contact 123 to one of the fixed contacts cooperating with contact 58' of differential D'. When the bus-tie switch is closed, and contact 123 consequently open, the circuit leading from finger $b'$ is open. With this condition contact finger $b$ furnishes the current for the circuit controlled by contact 58' of differential D' in its low slip position in addition to the current for the circuit controlled by contact 58 of differential D in its low slip position. This is effected by the connection established through contact 122 of the bus-tie switch. The contact segments 128 and 128' of the controllers, in the off position, respectively connect together the controller contact fingers $dd$, $ff$ and $d'd'$, $f'f'$, thus short-circuiting the contacts controlled respectively by the fixed contacts cooperating with the contacts 58 and 58' of the differentials D and D' in their low slip positions. The contact segments 127 and 127' energize contact fingers $cc$, $ee$ and $c'c'$, $e'e'$ positively from contact fingers $b$ and $b'$ respectively, in the off position of the controllers as in Fig. 1. Contact segments 80 and 80' energize the contact fingers $bb$ and $b'b'$ negatively from the contact fingers $y$ and $y'$ respectively as in Fig. 1.

The operation of the arrangement shown in Fig. 4 when the bus-tie switch 119 is open and switch 120 consequently in its right-hand position, as shown in the drawing, will now be set forth. Switches 124 and 124' will be closed to their operative positions and the controller corresponding to each row of contact fingers operated exactly as in Fig. 1. The starting torque of the motors will be developed in the high resistance squirrel cage windings 100 and 100'. At any predetermined desired slip differentials E and E' will close contacts 72 and 72' respectively to close contactors 106 and 106' to render the low resistance definite rotor windings effective just as the contactors 14 of Fig. 1 operate to short-circuit resistors 13. In its high slip position, as shown by the arrow, differential D moves contact 58 to complete a circuit from negative controller finger $x$ through contact 41 to operate pilot motor 38 to cut resistance 37 out of circuit, and in its low slip position contact 58 completes a circuit from positive controller finger $b$ through contact 122 and contact 42 to operate pilot motor 38 in a direction to insert resistance 37. In its high slip position differential D' moves contact 58' in the direction of the arrow to complete a circuit from negative controller finger $x'$ through contact 41' to operate pilot motor 38'' in a direction to cut out resistance 37', and in its low slip position contact 58' completes a circuit from positive controller finger $b'$ through contact 123, contact 58', and contact 42' to operate pilot motor 38'' in a direction to cut in resistance 37'. It is apparent, therefore, that contacts 122 and 123 cooperate with contacts 58 and 58' to establish the same operation as takes place in the arrangement shown in Fig. 1, that is to say, the operation of each differential mechanism is independent of that on the other side of the ship. The operation of the system is not materially complicated by the provision of pole changing switches for the propeller motors, since the pole changing switches 115, 115' and the speed controlling contacts 116, 116' are operated simultaneously with the propeller motor pole changing switches 98, 98' as heretofore set forth. If now it be desired to operate both motors from generator 3, switch 124' will be opened to render motors 17'' and 38'' inoperative. The bus-tie switch will be closed and switch 120 consequently placed in its left-hand position, both controllers will be operated in the desired direction and control motors 55, 55'', 113 and 113' will be set into operation as heretofore set forth. Differential mechanisms E and E' operate independently to close contacts 72 and 72' to operate contactors 106 and 106' to render the low resistance motor windings effective. While the slip in either motor is above the predetermined desired value, motor 38 will tend to operate in a direction to cut out resistance 37, and, if necessary, subsequently reduce the turbine speed as heretofore set forth. If, for example, differential D moves to its high slip position, it will complete a negative circuit from controller finger $x$ through contact 58 and limit switch 41 to pilot motor 38. If differential D' is in its high slip position, it will complete a like negative circuit from controller finger $x'$ through contact 58', contact 121 and limit switch 41 to pilot motor 38. If differential D only moves to its low slip position no circuit will be completed, but if differential D' also moves to its low slip position a circuit will be completed from controller finger $b$ through contact 58, contact 122, contact 58', contact 123 and limit switch 42 to operate pilot motor 38 in the reverse direction to cut in resistance 37. It will be noted that at this time both differential mechanisms D and D' cooperate with controller finger $b$, the circuit of controller finger $b'$ being open at switch 123.

It is apparent that one motor may be operated in one direction and one in the other direction for turning the ship if desired, and this operation may take place as well when both motors are operating from one generator, as when the generators are connected individually to their corresponding motors.

That this is true, is evident from the fact that motors 113 and 113' are reversed with the respective propeller driving motors so that the differential mechanisms operate in the same manner for either direction of rotation.

It may sometimes become necessary to operate one of the propeller driving motors from its non-corresponding generator. To operate propeller 6' from turbine 1, the controller having the unprimed contact fingers will be left in its off position and differentials D and E will therefore be set in high slip position as set forth in the description of the arrangement of Fig. 1. The bus-tie switch 119 will be closed, switch 120 will be in its left-hand position and switches 124' and 96' will be opened.

In its first position, the controller having primed contact fingers, which is the controller in use, energizes fingers w' and x' as in Fig. 1. Finger w' energizes the fields of motors 38, 111' and 55", the connection to the field of motor 38 being made through the switch 125. The energization of finger x' causes motor 38 to operate to cut resistance 37 out of the field circuit of generator 3. The circuit to the armature of motor 38 leads from x' through contact 58' of differential D', contact 121, switch 124 and limit switch 41.

In the second position of the controller finger z' is energized to close contactor 32 thereby completing the field circuit of the generator 3. The circuit of contactor 32 is completed from finger z' through contact 126 and switch 124.

In the third position of the controller finger a'a' is energized to set in motion the armature of the motor 55" as in Fig. 1.

When the slip of motor 99' has decreased to a predetermined value the differential E' is actuated to its low slip position thereby closing contacts 72', 73' and 74'. Through contacts 73' and 74' no circuit is completed at this time. The contact 72' establishes a circuit from the finger a'a' through switch 108' to close the switch 106'. Upon a further decrease in the slip the differential D' reverses and moves contact 58' to its low slip position to complete a circuit to the armature of motor 38 from the positive finger b, fingers dd, ff and segment 128, contacts 122, 58', 123, switch 124 and limit switch 42. The motor 38 operates to cut resistance 37 into the field circuit of the generator 3 and the generator excitation is regulated as set forth in connection with Fig. 1. The various steps in the operation of the system shown in Fig. 4 are the same as those previously set forth and it is considered unnecessary to describe them in further detail. To operate the propeller 6 from the turbine 1', the controller with the primed fingers is left in the off position and the system is controlled from the controller having the unprimed contact fingers, the switches 96 and 124 being opened.

It is apparent that my invention is not limited to the particular arrangement of circuits and switches shown in Fig. 4, but includes any arrangement of circuits and contacts for performing the functions that these circuits and switches perform in the combinations disclosed.

Figure 5:
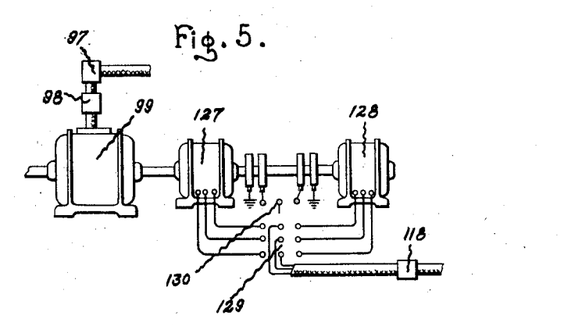
Fig. 5 represents a modification of one of the elements comprised in the combination shown in Fig. 4.

Fig. 5 represents an arrangement that may be used in place of the changeable pole combination for the auxiliary speed generator 111 of Fig. 4. In Fig. 5, two small synchronous generators 127 and 128 are used, together with a double throw switch 129 in the circuit leading through reversing switch 118 to motor 113. Generators 127 and 128 will be arranged to generate different frequencies and switch 129 will be manipulated with pole changing switch 98. A double throw switch 130 is arranged to be thrown simultaneously with switch 129 to energize the field circuit of either generator 127 or 128 depending on which generator is rendered effective by switch 129.

I have herein shown and particularly described certain embodiments of my invention and certain methods of operation for the purpose of explaining its principle and showing its application, but it will be obvious to those skilled in the art that many modifications and variations, other than those specifically referred to, are possible and I aim, therefore, in the appended claims, to cover all such modifications and variations as fall within the scope of my invention.

What I claim as new and desire to secure by Letters Patent of the United States, is,—

1. In an electric power system a work motor of the induction type, an alternating current generator adapted to supply current to said motor and differential mechanism arranged to control the slip of said motor comprising means connected to run at a speed proportional to slip and means arranged to run at a fixed speed.

2. An electric ship propulsion system comprising an induction motor arranged to drive a propeller, a synchronous generator adapted to be connected to supply current to operate said motor, and means arranged to regulate the excitation of said generator in accordance with the slip of the motor.

3. An electric ship propulsion system comprising an alternating current generator adapted to vary in frequency and voltage throughout a wide range, an alternating current motor arranged to drive a propeller and to be supplied from said generator and adapted to operate as an induction motor, and means responsive to changes in slip from a predetermined number of cycles arranged to cooperate in the system to control the slip of the propeller driving motor.

4. An electric ship propulsion system comprising an induction motor arranged to drive a propeller, a synchronous generator adapted to be connected to supply current to operate said motor, and means arranged to operate at a predetermined value of slip to change the secondary connections of said motor to vary its torque characteristics, and arranged to regulate the excitation of said generator in accordance with departures from a different predetermined value of slip.

5. An electric ship propulsion system comprising an induction motor arranged to drive a propeller, a synchronous generator adapted to be connected to supply current to operate said motor, driving means for said generator, means arranged to regulate the excitation of said generator in accordance with the slip of the motor and means arranged to change the speed of said driving means when a predetermined value of excitation is coincident with a predetermined slip.

6. In an electric power system a work motor of the induction type, an alternating current generator adapted to supply current to said motor differential mechanism for controlling the operation of said motor comprising a motor connected to run at a speed proportional to slip and a constant speed motor, and a controller for controlling the operation of said system comprising means for controlling one of the motors of said differential mechanism to set the different mechanism in the high slip position when the controller is moved to the off position.

7. In an electric ship propulsion system, an elastic-fluid turbine, means for governing the turbine speed, means for adjusting the governor setting comprising a governor controlling member, a pilot motor, a member driven thereby, means adapted to lock said governor controlling member and said driven member together, an adjustable lever adapted to move independently of said governor controlling member and also arranged to be connected to operate the same independently of said driven member and a limit switch in the circuit of said pilot motor, the effective position of which is controlled by the position of said lever.

8. In a regulating system, means adapted to vary in effect in response to some condition of said system, means adapted to exert a predetermined effect, means for regulating the system, means adapted to move in response to the algebraic sum of said effects arranged upon a predetermined movement to control said regulating means, and means adapted upon a smaller movement of said means to alter said predetermined effect whereby hunting of said regulating means is prevented.

9. In an electric propulsion system, a synchronous generator, an alternating current work motor, a motor connected to operate at a speed proportional to the frequency of slip in the work motor, a motor adapted to run at constant speed, differential mechanism comprising a member adapted to move in response to the difference between the speeds of said slip and constant speed motors arranged upon a predetermined movement in either direction to establish a circuit for regulating the system to control the motor torque and means for adjusting the operation of said constant speed motor between the limits of regulating movement of said member whereby hunting of said member between such limits is prevented.

10. An electric ship propulsion system comprising a synchronous generator, an induction motor arranged to drive a propeller, a device adapted to run at constant speed, an auxiliary motor connected to be dependent upon the speed of the propeller shaft for producing a speed proportional to the frequency of slip in the propeller driving motor, means for regulating the generator in response to the results of said constant speed and said slip speed, pole changing means for varying the speed of the propeller driving motor and mechanism adapted to be operated simultaneously with said pole changing means for maintaining the speed of the auxiliary motor at the frequency of slip and connections adapted to be operated simultaneously to vary the speed of said constant speed device.

11. In an electric ship propulsion system, a plurality of propellers, induction motors arranged to drive a plurality of said propellers, a synchronous generator adapted to be connected to supply current to operate a plurality of said motors, means arranged to control the operation of said generator to increase the torque of the motors whenever the slip of any of the connected motors exceeds a predetermined value and to decrease the torque of the motors whenever the slip of a plurality of the connected motors falls below a predetermined value.

12. In an electric ship propulsion system a plurality of propellers, a plurality of induction motors arranged to drive said propellers, a synchronous generator adapted to be connected to supply current to operate said motors, means arranged to control the excitation of said generator to increase the same whenever the slip of any motor exceeds a predetermined value and to decrease the same whenever the slip of every motor is less than a predetermined value.

13. In an electric ship propulsion system a plurality of propellers, an induction motor arranged to drive each propeller, a plurality of synchronous generators, connections whereby the motors for the respective propellers may be supplied either individually from the various generators or collectively from one generator, means arranged to be connected to control the excitation of each generator in accordance with the slip of the corresponding propeller driving motor when the individual connection is used and to be connected, when the collective connection is used, to control the excitation of the generator to increase the same whenever the slip of any motor exceeds a predetermined value and to decrease the same whenever the slip of every motor is less than a predetermined value.

In witness whereof, I have hereunto set my hand this 7th day of February, 1923.

DAVID C. PRINCE.